United States Patent [19]
Pfister

[11] Patent Number: 5,231,502
[45] Date of Patent: Jul. 27, 1993

[54] IMAGE INFORMATION PROCESSING TECHNIQUES FOR IMPROVING THE RESOLUTION OF SCANNED IMAGING SYSTEMS

[75] Inventor: William R. Pfister, Schaumburg, Ill.

[73] Assignee: Recon/Optical, Inc., Barrington, Ill.

[21] Appl. No.: 699,000

[22] Filed: May 13, 1991

[51] Int. Cl.⁵ .................... H04N 3/14; H04N 5/335
[52] U.S. Cl. ..................... 358/213.11; 358/213.26; 358/109; 358/213.28
[58] Field of Search ............. 358/109, 213.31, 213.27, 358/213.28, 213.11, 213.29, 213.26

[56] References Cited

U.S. PATENT DOCUMENTS

| | | | |
|---|---|---|---|
| 4,129,887 | 12/1978 | Michon | 358/213.13 |
| 4,280,141 | 7/1981 | McCann et al. | 358/109 |
| 4,330,796 | 5/1982 | Anagnostopoulos et al. | 358/213.17 |
| 4,679,090 | 7/1987 | Erhardt | 358/213.26 |
| 4,764,813 | 8/1988 | Murayama et al. | 358/213.11 |
| 4,952,809 | 8/1990 | McEwen | 358/213.24 |
| 4,989,086 | 1/1991 | Schaff et al. | 358/109 |

OTHER PUBLICATIONS

A. Lareau and C. Chandler, Advanced CCD Reconnaissance Detector, vol. 694, SPIE Proceedings Airborne Reconnaissance X, pp. 124–129 (1986).
Streetman, Solid State Electronic Devices, pp. 355–361 (1980).
EG&G Reticon, RA2048J, TDI CCD specifications, pp. 137–138 (1989).
C. Sequin & M. Thompsett, Charge Transfer Devices, pp. 1–57, Bell Telephone Laboratories, Academic Press (1975).
Fink & Christiansen, eds., Electronics Engineers' Handbook, 3rd Ed., pp. 20-44-20-46 (1989).
Schroder, Modular Series on Solid State Devices-Advanced MOS Device, Addison-Wesley Publ. Co., CH. 3, 4 (1987).

Primary Examiner—Herbert Goldstein
Assistant Examiner—Wendy R. Greening
Attorney, Agent, or Firm—Allegretti & Witcoff, Ltd.

[57] ABSTRACT

Improved apparatus and methods of image information processing are disclosed which extend the operational coverage of an image system to higher velocity to height ratio scenarios while optimizing image resolution. The invention typically is implemented by a time delay and integrate charge-coupled device. In conjunction with an image variable row scan rate, a novel method of clocking the device is used to adjust the number of cycles of clocking performed in one row read out time, and to simultaneously transfer pixel information located in a plurality of rows of an imaging array having a predetermined row relationship. The relationship between the variable row scan rate, the predetermined row relationship and the number of cycles of clocking is adjusted so that the scan rate can increase above a maximum base scan rate by a factor of $(AB)/(B-1)$, where A is the number of cycles of clocking performed and B is an integer corresponding to the predetermined row relationship. This increased scan rate and clocking optimizes resolution in the extended operational coverage scenario at $(B-1)/(AB)$. In some non-scanning applications, the velocity to height ratio will determine the rate of image movement across the array, and the row relationship and the number of cycles of clocking will be the chosen parameters to optimize resolution.

25 Claims, 9 Drawing Sheets

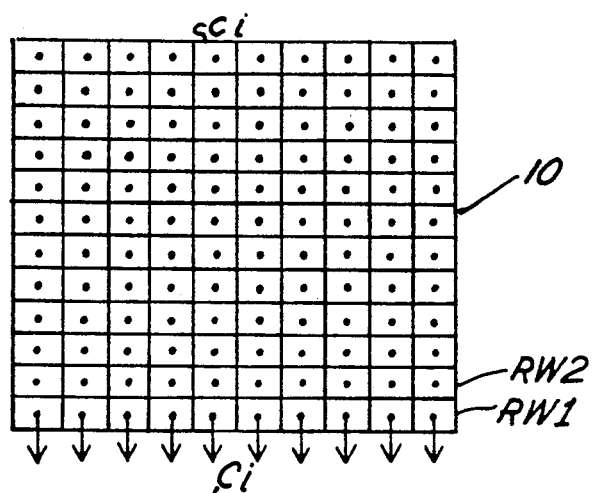
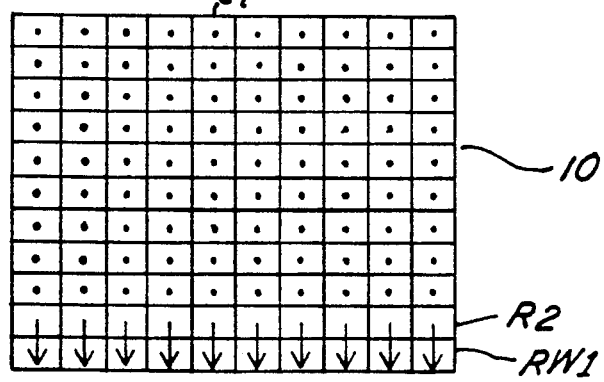
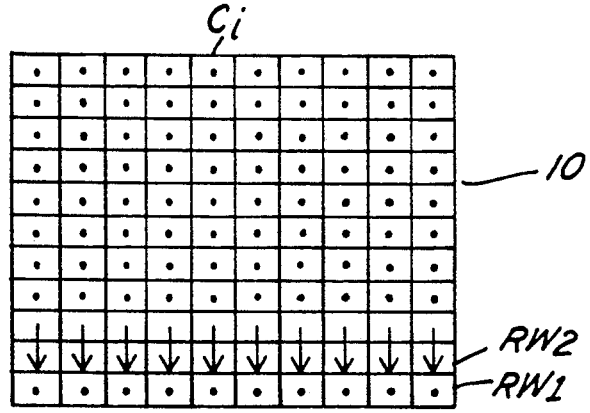
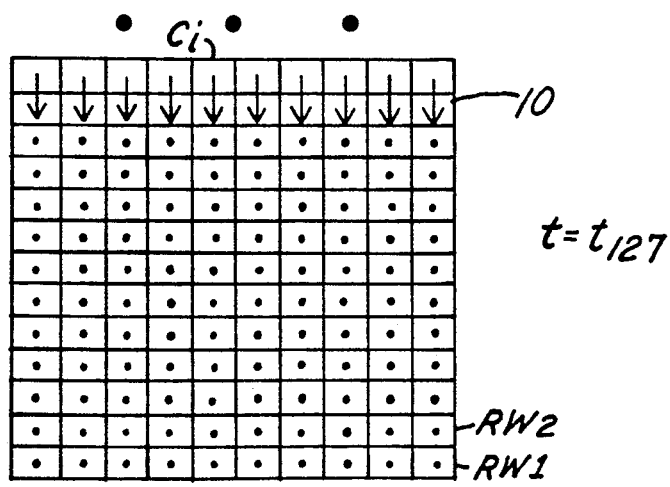
Fig. 3C (PRIOR ART)

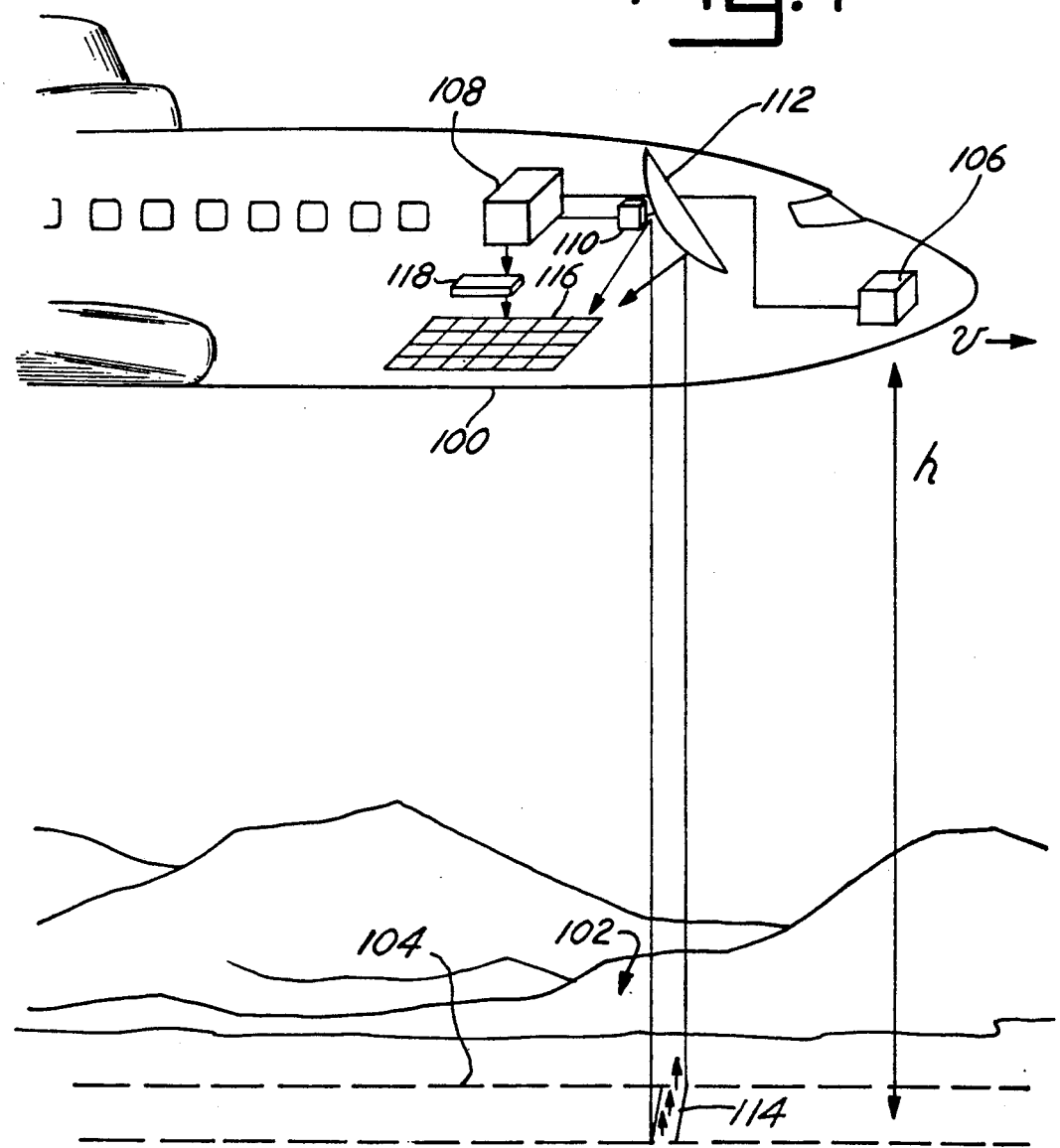

IMAGE INFORMATION PROCESSING TECHNIQUES FOR IMPROVING THE RESOLUTION OF SCANNED IMAGING SYSTEMS

BACKGROUND OF THE INVENTION

A. Field Of The Invention

This invention relates generally to image processing techniques and more particularly, to apparatus and techniques for optimizing the resolution of scanned imaging systems. Even more particularly, the invention relates to an improved apparatus and novel method of clocking a time delay and integrate charge-coupled device to extend its operational coverage (e.g., in an airborne reconnaissance application, at higher velocity to altitude ratios) by increasing the rate of charge motion through the device in synchronism with an increased image scan speed with only minimal losses of image resolution.

B. Description Of Related Art

Time delay and integrate charge-coupled devices are solid state imaging devices that use a flow of charge through an array to image a scene. Background information on charge-coupled devices can be found in Streetman, *Solid State Electronic Devices*, Prentice-Hall pp. 355-361 (1980), and in Schroder, *Modular Series on Solid State Devices-Advanced MOS Devices*, Addison-Wesley Pub. Co., ch. 3, 4 (1987). An additional reference discussing charge transfer and charge-coupled devices is C. Sequin and M. Tompsett, *Charge Transfer Devices*, Bell Telephone Laboratories, Academic Press (1975). The time delay and integrate mode of operation of a charge-coupled device is a well-known technique for increasing the sensitivity of a line scan imaging array.

A time delay and integrate charge-coupled device may, as an example, have sixty-four rows (or more) of charge integration with a horizontal resolution of perhaps 2,048 pixel elements, arranged in a linear array. By synchronizing the relative motion of the image scene down the array with a clock frequency in the vertical (time delay and integrate) direction, the charge containing scene information is summed over the number of available time delay and integrate rows across the 2,048 columns. Time delay and integrate mode of operation thus effectively increases the total array exposure time to the image by a factor of 64, compared to a typical line scan sensor, without sacrificing the resolution in the scan direction or the scanning speed.

The increased sensitivity gained in time delay and integrate mode makes the charge-coupled device a particularly useful imaging device in aerial reconnaissance photography, particularly in low light conditions. For details on how such a charge-coupled device may be designed and built, see A. Lareau & C. Chandler, *Advanced CCD Reconnaissance Detector*, Vol. 694, Proceedings of SPIE—The International Society for Optical Engineering (1987).

In operation, the image from the scene is scanned by a mirror to impinge on the front row of the array. The electrical signal (a charge packet) containing scene information will be collected in the potential wells of the front row during an integration period which corresponds to one line time. One line time equals 1/vertical clock frequency. The charge packet is then shifted vertically to the next sequential row after one line time. As the scene is allowed to be imaged on the subsequent row, the charge packets created are summed with those of the previous row. This process is repeated over the time delay and integrate rows, finally resulting in a line (row) of 2,048 elements that have integrated 64 line times in our example. The information is then transferred in parallel via a transfer pulse to a horizontal output shift register, to be clocked out serially within one line time. Since the subsequent scene follows only one row behind, the next line scan is read out only one line time later. In this way, the charge-coupled device puts out one line of image every line time continuously.

To assist in understanding how a time delay and integrate charge-coupled device uses the flow of charge packets through an array in synchronism with a scanned image that impinges on the array, the reader is directed to FIG. 1 which is an illustration of how charge packets containing scene information are moved through a prior art time delay and integrate charge-coupled device in synchronism with a scanned image. The imaging array of an exemplary prior art time delay and integrate charge-coupled device 10 is shown as having 64 rows (e.g., exemplary rows RW1, RW2, and RW62-64) of 2,048 columns (e.g., exemplary columns C1-C4 and C2,045-C2,048). The scan line 12 of an image impinges on the array in row RW64. Electrical signals (charge packets) containing pixel information representing scan line 12 will be collected in the potential wells of row RW64 during an integration period of one line time. The charge packet is then shifted vertically to the next row, RW63. As the scan line is imaged on row RW63, the charge packets created are summed with those from row RW64, while a new scan line of the image is now scanned on row RW64. This process is repeated over the 64 rows resulting, in row RW1, a row of 2,048 elements that have integrated for 64 line times. The pixel information in row RW1 is then transferred in parallel via a transfer pulse to a row readout device, such as an output multiplexer 14, and is clocked out serially within 1 line time (i.e., one row readout time period). Since the subsequent scan line of the scene follows only one row behind, the next line scan is read out, containing new pixel information, only one line time later. Thus, the array reads out scene scan line information continuously one line at a time.

FIG. 2 is a diagram of the representative prior art array of FIG. 1, but showing the relationship between the array 10 and the external clock inputs that control the charge motion. FIG. 2 shows a 64-stage shift register 16 having stages 1-64 (e.g., exemplary stages SR1-SR64 and SR62-SR64) and a 64-stage corresponding clock driver 18. The output of each stage of shift register 16 drives the corresponding stages of the clock driver 18 as shown by the arrows. The 64 stage clock driver 18 drives its corresponding array row (or phase) as shown. It is conventional to show the internally generated clocks $\phi_1$-$\phi_{64}$ for the rows on conductors $C\phi_1$, $C\phi_2$, through $C\phi_{64}$.

The external interface to this circuitry includes 3 clock signals, shown in FIG. 2 as an initiating or trigger clock signal $R_{IN}$, and ripple clock signals $R_1$ and $R_2$, that are conducted over conductors $CR_{in}$, $CR_1$ and $CR_2$, respectively. Signal $R_{IN}$ injects a zero "0" pulse into the input end 20 of shift register 16. Signals $R_1$ and $R_2$ shift the injected "0" stage by stage through the shift register, with each cycle of $R_1$ and $R_2$ shifting the "0" one stage.

A cycle of operation of the charge couple device (called "burst ripple" clocking) consists of injecting the trigger clock Rin into the shift register 16 and shifting, one row at a time, the charge packets down the rows of the array 16. If the cycle is repeated once each line time, the charge packets travel one line height per line readout time over the entire array. This is the line rate at which the target image scan must be synchronized for time delay and integrate operation to avoid image smear, or, in other words, to achieve full image resolution in the scan direction.

Referring now to FIG. 3a, the 64 phase clocking known in the art is illustrated. The signal $R_{IN}$, at time t=0, is injected into the input end of the shift register 16, and the $R_1$ and $R_2$ signals shift the "0" pulse stage by stage through the shift register 16. This shifting of the "0" pulse through the shift register causes the internal clocking of the 64-stage clock driver 18 to generate the clocking shown. First, clock $\phi_1$ (for row RW1) outputs a "0" pulse, then clock $\phi_2$, etc., up to clock $\phi_{64}$. The time it takes to "ripple" through the 64-stage clock driver 18 is 1 line time. In one row readout time period, all the charge packets in the rows of the array are shifted by one row. FIG. 3a shows 1 cycle of 64 phase clocking.

FIG. 3b shows the motion and position of charge packets in one column of the array 10, arbitrarily selected to be column Ci, at various separated points in time during one line time (i.e., time t=0 to time t=LT). The points in time T1—T7 and T127 shown in FIG. 3a are repeated in FIG. 3b to show the times when the motion of the charge packets occurs. At time T1, while $\phi_1$ is in a "0" state, charge packet 22 in column Ci is shifted from row RW1 to output multiplexer 14 as shown by arrow 24. At time T2 after the shifting is completed and $\phi_1$ has returned to the "1" state, charge packet 22 is absent from row RW1. At time T3, while $\phi_2$ is in a "0" state, charge packet 26 in column Ci is shifted from row RW2 to row RW1 as shown by arrow 28. At time T4, after the shifting is completed and $\phi_2$ has returned to its "1" state, charge packet 26 is absent from RW2. At time T5, while $\phi_3$ is in a "0" state, charge packet 30 in column Ci is shifted from row RW3 to RW2 as shown by arrow 32. At time T6, after the shifting is completed and $\phi_3$ has returned to its "1" state, charge packet 30 is absent from row RW3. At time T7, while $\phi_4$ is in a "0" state, charge packet 34 in column Ci is shifted from row RW4 to row RW3 as shown by arrow 36. At time T127, while $\phi_{64}$ is in a "0" state, charge packet 38 in column Ci is shifted from row RW64 to row RW63 as shown by arrow 40.

FIG. 3c shows four "snap-shots" of the whole array 10 at t=T1, t=T3, t=T5 and t=T127 given the clocking of FIG. 3b. Each "snap-shot" of the array shows the movement of charge from one row to an adjacent row. After 64 line times, the scene in row RW64 at t=0 will have been shifted down and out of the array. Note that by clocking in the above known manner, all charge packets remain separated. The scan speed is synchronized with the rate of charge motion which is approximately one line height in one line readout time.

Any charge-coupled device has a maximum line or row readout rate constrained by the pixel output rate. The readout rate is the reciprocal of the row readout time period and generally is expressed in rows read out per second. As a result, any charge-coupled device is constrained to a maximum scan rate with full resolution. Scanning faster (i.e., having the row scan rate exceed the row readout rate) without increasing the rate of charge motion only smears the image. When the airplane velocity to height ratio exceeds the operational limits of the charge-coupled device, image resolution decreases rapidly as prior art clocking is performed, thus constraining the airplane to relatively low velocity to height scenarios.

In an airborne reconnaissance application, as the aircraft velocity to height ratio increases, e.g., the airplane's velocity increases or it flies at a lower altitude, the airplane passes over more ground in less time. At some point, the limiting maximum scan rate causes the device to miss a portion of the ground scene due to the high velocity to height ratio exceeding the limit for full operational coverage. To remedy the situation, one could try to double the scan rate to double the coverage. However, if one keeps the same line rate and "burst ripple" clocking while operating in a 64 row time delay and integrate mode, the image would be smeared to 1/32 of full resolution. This drastic reduction in resolution is the result of non-synchronous scan speed versus charge motion. Note that if one were utilizing only the first time delay integrate row, in a best case scenario, the resolution at double the scan rate would be reduced by one half.

It is thus a principal object of the present invention to increase and extend the operational coverage of imaging systems while at the same time optimizing image resolution.

It is another object of the invention to enable imaging systems to be used in velocity and height regimes that are extended beyond the typical operational coverage of such devices.

Yet another object of the invention to enable an airplane carrying a time delay and integrate charge-coupled imaging device to fly faster and at lower altitudes than before, with optimal resolution capability.

Still another object of the invention is to enable an airplane carrying a time delay and integrate charge-coupled imaging device in a military scenario to decrease the risk of enemy detection and hostile fire while still creating a image of acceptable resolution.

SUMMARY OF THE INVENTION

Surprisingly the applicant has been able to achieve the foregoing objects and others by using an image information system comprising an array of cells capable of representing pixel information arranged in rows and columns, each row being adapted to be scanned with radiation at a variable row scan rate, and further comprising row read out means for transferring pixel information represented by a row of the cells to a utilization device at a predetermined row read out rate corresponding to a predetermined row read out time period. The applicant has discovered that resolution of such a system can be optimized by providing row transfer means for simultaneously transferring pixel information located in a plurality of the rows having a predetermined row relationship and for transferring pixel information located in a predetermined number of the rows to the read out means during the row read out time period. Adjusting means are used to adjust the relationship between the variable row scan rate, predetermined row relationship and predetermined number of rows, whereby operational coverage of the system is extended while the row scan rate exceeds a maximum row read out rate of the row read out means.

In one aspect of the invention, the predetermined row relationship is defined by dividing at least some of the rows into a plurality of groups of B rows, where B is a positive integer greater than 1. One of the rows in each group is selected for simultaneous transfer of pixel information by the row transfer means. The adjusting means operates so that the row scan rate is inversely proportional to B−1.

In another aspect of the invention, the predetermined number of rows transferred to the row readout means is set equal to A, where A is a positive integer greater than 0, and the adjusting means operates so that the row scan rate is directly proportional to A times B.

In the preferred embodiment of the invention, the row read out rate defines a base row scan rate, and the adjusting means operates so that the row scan rate substantially equals the base row scan rate times $AB/B-1$. The reciprocal, $B-1/AB$, is the optimal resolution, where a resolution of 1 equals full resolution. This reduction in resolution is typically acceptable, since the higher velocity-height ratio in the extended dynamic range scenario normally signifies a lower altitude and better ground resolvable distance.

The increased row scan rate itself may be dictated by the higher velocity to height ratio in a non-scanning application, in which case the predetermined row relationship and the predetermined number of rows transferred to the row readout means are the chosen parameters. Alternatively, the rate at which a scanning mirror scans an image across the charge-coupled device may be increased according to the predetermined row relationship and the predetermined number of rows transferred to the row readout means.

By using the foregoing techniques, the useful operational range of the image information processing system can be increased many fold. By employing the foregoing techniques rather than the prior art, an airplane can fly faster and at lower altitudes while maintaining optimal resolution, thereby decreasing the risk of enemy detection and hostile fire.

BRIEF DESCRIPTION OF THE DRAWINGS

These and other objects, advantages and features of the present invention will appear for purposes of illustration but not limitation in connection with the accompanying drawings wherein:

FIG. 3b is an illustration of the charge motion down one random column of the array of FIG. 2 as a function of time using the prior art clocking shown in FIG. 3a;

FIG. 3c is a sequence of "snapshots" of the array during one line time given the clocking of FIG. 3a;

FIG. 4 is an illustration of an image information processing system incorporating a preferred form of the present invention;

FIG. 9b is an illustration of the charge motion down one random column of the array as a function of time using the clocking according to the form of the present invention shown in FIG. 9a;

FIG. 10b is an illustration of the charge motion down one random column of the array as a function of time using the clocking shown in FIG. 10a.

Figure 5:
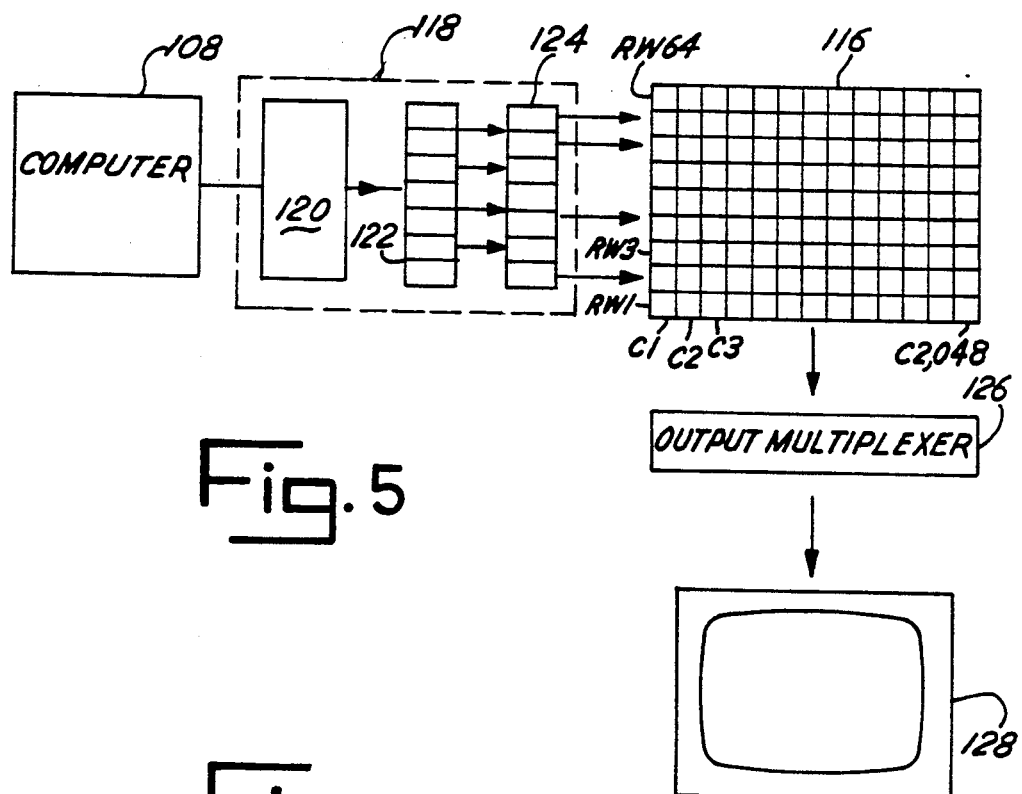
FIG. 5 is a block diagram of certain components of the system of FIG. 4.
Figure 1:
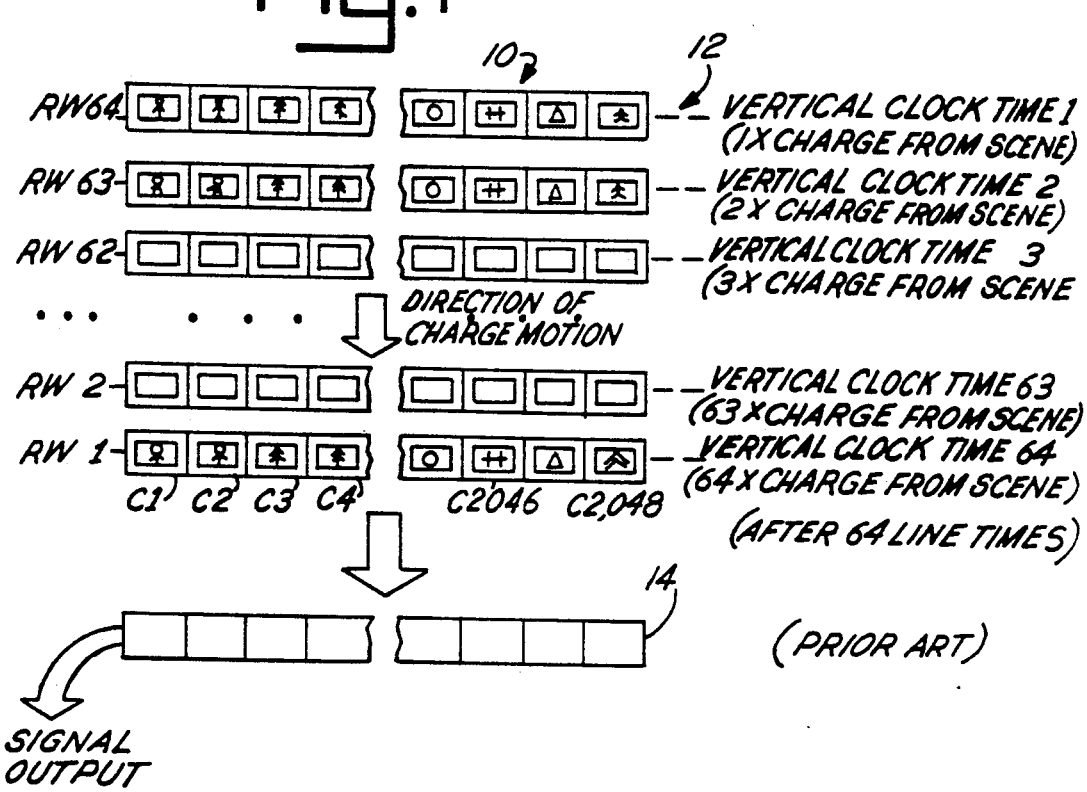
FIG. 1 is an illustration of how charge packets containing scene information are moved through a prior art time delay and integrate array in synchronism with the scanned image.

DETAILED DESCRIPTION OF THE PREFERRED EMBODIMENT AND IMPLEMENTATION OF THE METHOD

Referring to FIG. 4, a preferred form of the present invention can be used to advantage in an airplane 100 which flies over terrain to be imaged 102 along a path 104 shown in dashed lines. The airplane has an avionics and navigation system 106 that determines, among other things, the airplane's ground velocity (v) and height (h). The avionics system 106 provides the velocity and height data to an image processing system control unit shown as a computer 108. The image processing system control unit operates a driver 110 for a scan mirror 112 in order to scan radiation from an image scene 114 onto an imaging array 116 at a variable scan rate. Array 116 is an array of semiconductor cells arranged in rows and columns capable of storing packets of charge representing pixel information. The scan rate is the number of rows of array 116 scanned per second. In the preferred embodiment, the scan rate is determined in part by the rate of motion of the mirror 112.

In accordance with the teachings of the present invention, the computer 108 adjusts the relationship between the variable scan rate of the scan mirror driver 110 and the flow of electric charge representing pixel information through the array to optimize image resolution as airplane 100 flies faster or lower in an extended operational coverage scenario. Computer 108 sends a control signal to a row transfer unit 118 which, in turn, provides control signals to imaging array 116.

Referring to FIG. 5, the computer 108 provides the necessary control voltage signals to row transfer unit 118 which includes a clock generator 120, shift registers 122 and clock drivers 124 which provide clock pulses to array 116. Typically, array 116 has 64 rows (RW1–RW64) and 2,048 columns (C1–C2,048). The clock pulses control the flow of charge down the rows in the array and out of the array into a row read out device or output multiplexer 126. Row read out device 126 transfers pixel information represented by a predetermined number of rows of the cells to a utilization device 128, such as a recorder or video display, during one row read out time period (i.e., one line time).

Figure 6:
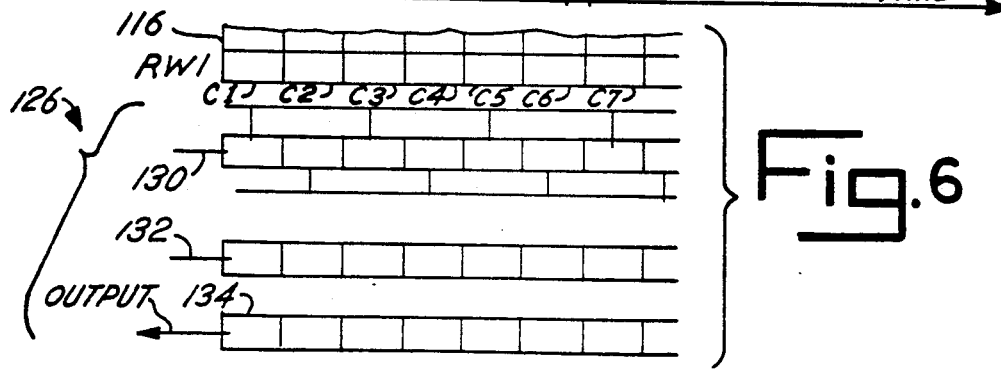
FIG. 6 is a block diagram of a preferred form of an output multiplexer for use in the present invention.

A more detailed view of row readout device 126 is shown in FIG. 6. Immediately below row RW1 is a field storage region 130 which accepts charge from row RW1. When more than one row of the array is transferred to readout device 126 during one row readout time as described hereinbelow, the field storage region is necessary to provide for the summation of charge in these rows. The field storage region 130 has separate control lines for the even and odd pixels such that the even and odd pixels are shifted through a transfer gate 132 to a horizontal output shift register 134 separated in time to avoid any loss in horizontal resolution.

Figure 7:
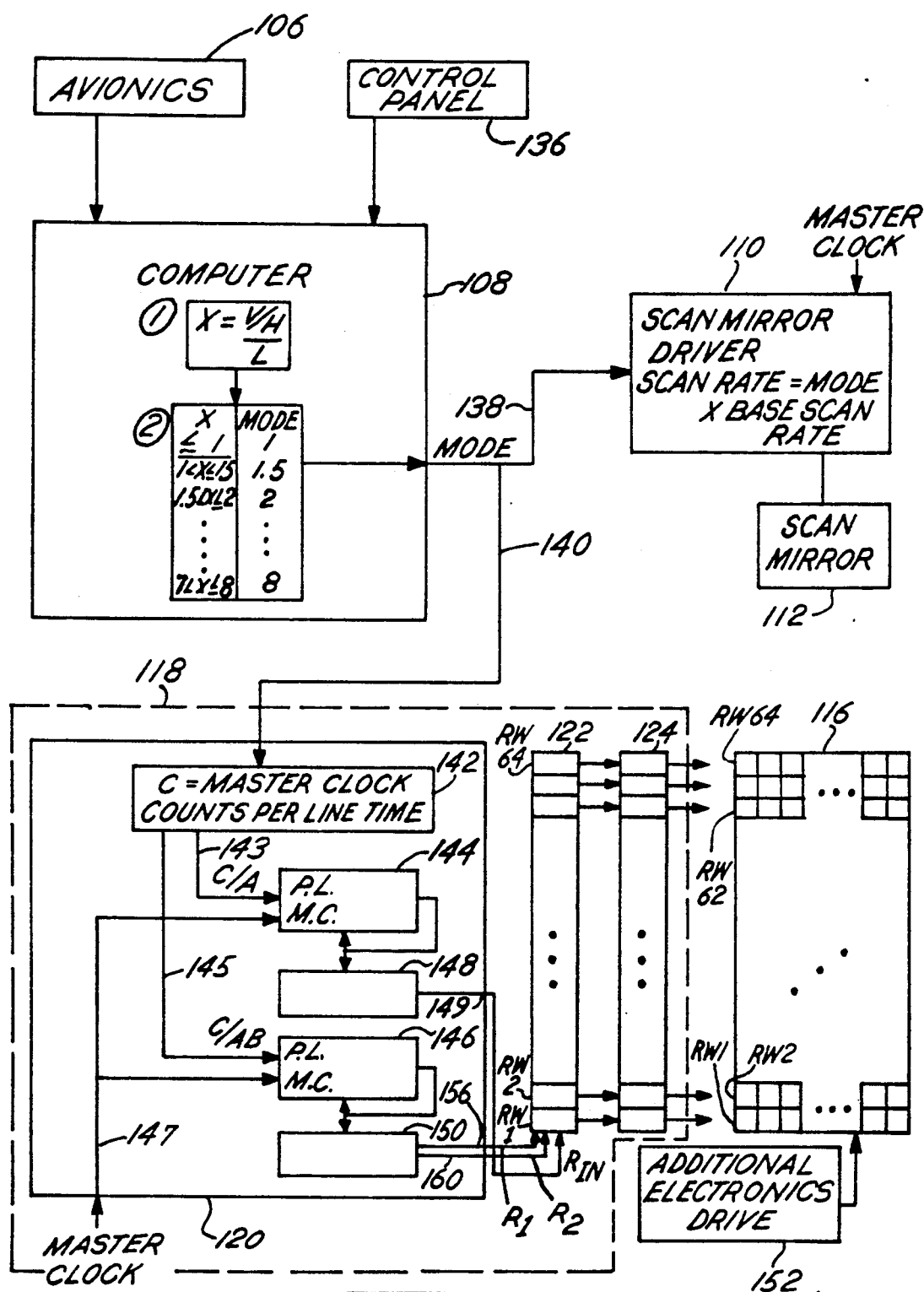
FIG. 7 is a block diagram of a preferred form of implementation of the invention.

FIG. 7 represents in even greater detail a block diagram for a preferred form of implementation of the invention. Velocity and height data from aircraft avionics 106 (FIG. 4), and operator inputs from a control panel 136 are sent to computer 108. Stored in computer 108 is a value "L" that represents the limit to the velocity/height ratio at which full system resolution and mission coverage is achieved (i.e., the highest value of the velocity/height ratio at which normal clocking can achieve full resolution). L is a function of some or all of the following. The base row readout rate of row readout device 126 (FIG. 6); mission requirements, for example, overlap requirements per scanned frame or degrees per scan; lens focal length (not shown in FIG. 4); and pixel size in the scanned direction. The instantaneous velocity/height ratio is determined by the avionics system. The computer via software determines in a first step the value X, which equals the instantaneous velocity/height ratio divided by the parameter L. In a second step the computer defines a limited number of modes where if X is less than 1 the mode is 1, if X is between 1 and 1½ the mode is 1.5, if X is between 1.5 and 2 the mode is 2, and so on up to a maximum value for X of perhaps 8. If X is less than 1, full resolution is maintained by normal operation. (That is, the scan rate equals the base row readout rate and 64 phase clocking is used. Full resolution is achieved at the base scan rate with 64 phase clocking since charge from one row of the array is not mixed with charge from another row.)

After the computer determines the mode for the system, the mode value is provided over a data bus 138 to scan mirror driver 110 which determines the scan rate for mirror 112. The scan rate for array 116 is the mode multiplied by the base rate. The scan mirror driver drives the scan mirror 112 at a speed that will achieve the desired scan rate.

Figure 2:
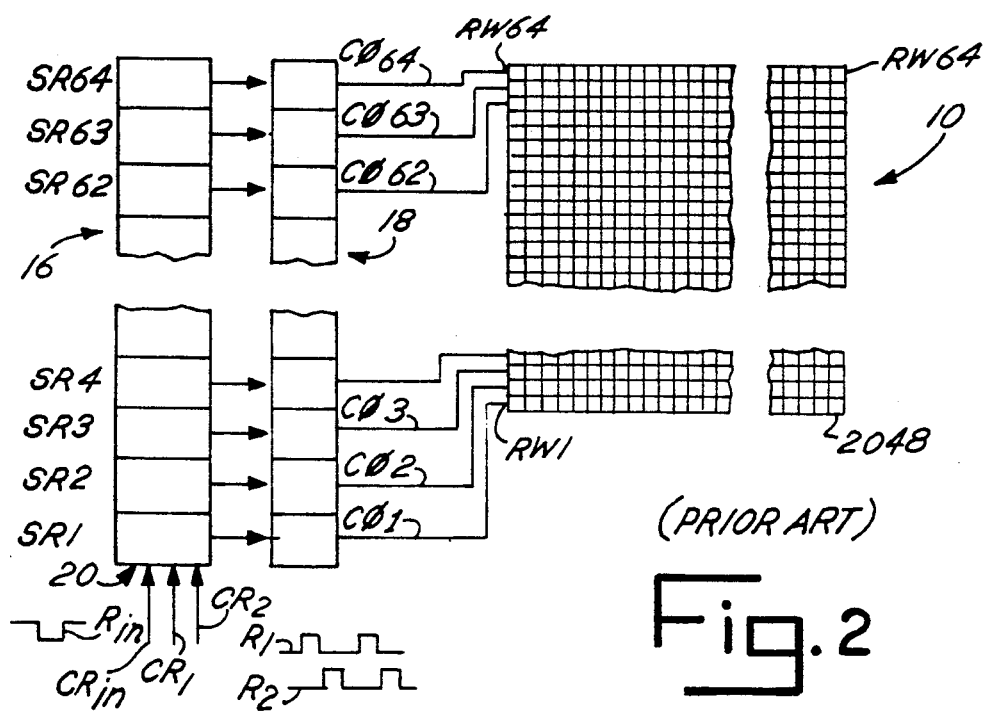
FIG. 2 is a diagram of the prior art time delay and integrate imaging array of FIG. 1 showing the relationship between the array and the external and internal clocks.

The mode value also is supplied over a data bus 140 to clock generator 120. A memory cell 142 in the clock generator stores the various values of A (the number of rows transferred to the row readout device in 1 cycle of clocking, described below) and B (the number of phases selected, described below) corresponding to the available modes in which the system may be operating. Memory cell 142 also stores a value "C" representing a preprogrammed base line rate value, equal to the number of master clock counts per line time. For the various modes (in this example from 1 to 8) and for values of A and B stored in memory cell 142, a preload signal is provided to a counter 144 over a bus 143 proportional to the quantity C divided by A. The memory cell 142 also provides a second signal to a counter 146 over a bus 145 that is proportional to C divided by A times B. Counters 144 and 146 also receive master clock inputs over a bus 147. A clock driver 148 provides the $R_{IN}$ voltage pulse to shift register 122 over a conductor 149. Similarly, a clock driver 150 provides the ripple voltage signals $R_1$ and $R_2$ (having similar wave forms as in FIG. 2) to shift register 122 over conductors 156 and 160. Additional drive electronics supporting and controlling the imaging array, input registers, and output registers, are denoted by block 152. The additional drive electronics are well known in the art and need not be described in detail.

When the preload value C divided by A is provided to counter 144, counter 144 counts at the master clock frequency up to the preload value and then issues a trigger signal to clock driver 148 and issues a reload signal back to counter 144. When clock driver 148 receives the trigger signal, the $R_{IN}$ pulse is sent to shift register 122. Similarly, when the preload value C divided by AB is provided to counter 146, counter 146 counts at the master clock frequency until reaching the terminal count, whereupon a trigger signal is provided to associated clock driver 150 and a reload signal is provided back to counter 146. Upon receiving the trigger signal, clock driver 150 provides the $R_1$ and $R_2$ voltage pulses to the 64 stages of the input shift register 122 of imaging array 116. A programmer of ordinary skill in the art will be able to implement via software coding the functions performed by the computer and clock driver detailed above.

Figure 8:
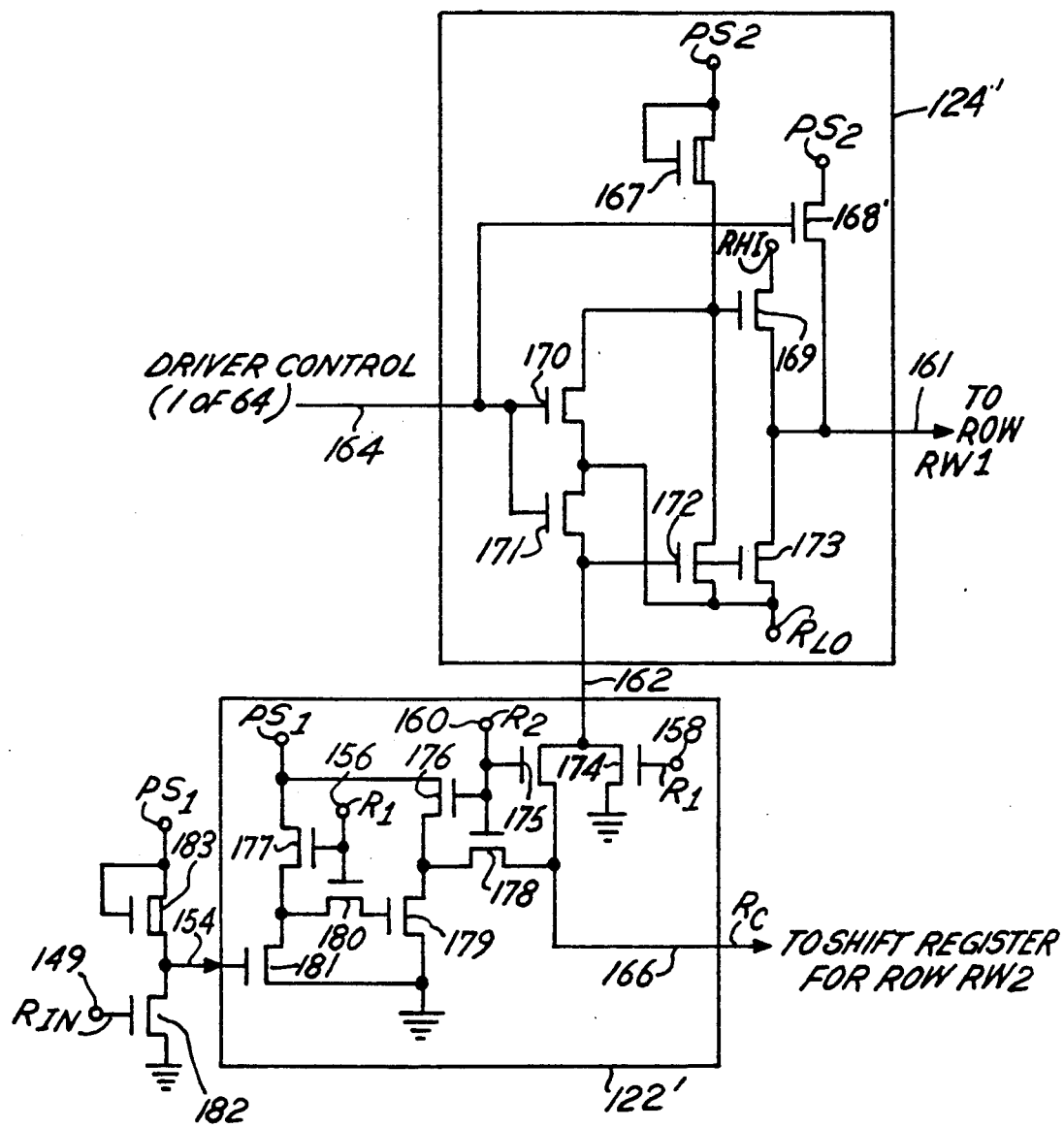
FIG. 8 is a schematic diagram of a preferred form of shift register and clock driver circuit made in accordance with the present invention for use in connection with one row of an array.

A schematic diagram of a preferred form of clock driver and shift register circuit made in accordance with the present invention is shown in FIG. 8. The first stage of the 64 stage shift register 122 is denoted by the numeral 122', which receives the $R_{IN}$ signal at an input conductor 154. The $R_1$ clock signal inputs are provided at terminals 156 and 158, and the $R_2$ inputs are provided at a terminal 160. In FIG. 8, PS1 represents a first power supply input terminal, and PS2 represents a second power supply input terminal.

The first stage 124' of 64 stage clock driver 124 (FIG. 7) receives the ripple output voltage signal from shift register stage 122' along a conductor 162. Clock driver stage 124' receives a driver control or enable signal along a conductor 164 from a length decoder circuit which enables a particular number of time delay and integrate rows depending on the light level. The $R_{LO}$ and $R_{HI}$ conductors transmit voltage signals for controlling the magnitude of the low level voltage and the high level voltage of the time delay and integrate phase drive lines. The output of the clock driver stage 124' goes to row RW1 of array 116 (FIG. 7) over a conductor 161. The output signal $R_C$ of shift register stage 122' is provided as the input signal for the second stage of shift register 122 (FIG. 7) over a conductor 166. The shift registers and clock drivers for rows RW2 through RW64 are identical to those illustrated in FIG. 8. Transistors 167-183 shown in FIG. 8 are n-channel MOS junction field effect transistors. Transistors 167 and 183 are used as pull-up constant current sources. Those of ordinary skill in the art will appreciate that the details of construction of the shift register and clock driver, and the choice of transistors for the shift register and the clock driver may vary somewhat depending on the particular requirements of the system.

Referring to FIG. 5, row transfer unit 118 simultaneously transfers pixel information located in a plurality of rows of array 116 having a predetermined row relationship, and transfers pixel information located in a predetermined number of rows to row readout circuit 126 during one row readout time period. The computer or adjusting unit 108 adjusts the relationship between the variable row scan rate, predetermined number of rows, and row relationship, to optimize image resolution in the extended operational coverage scenario.

Figure 3A:
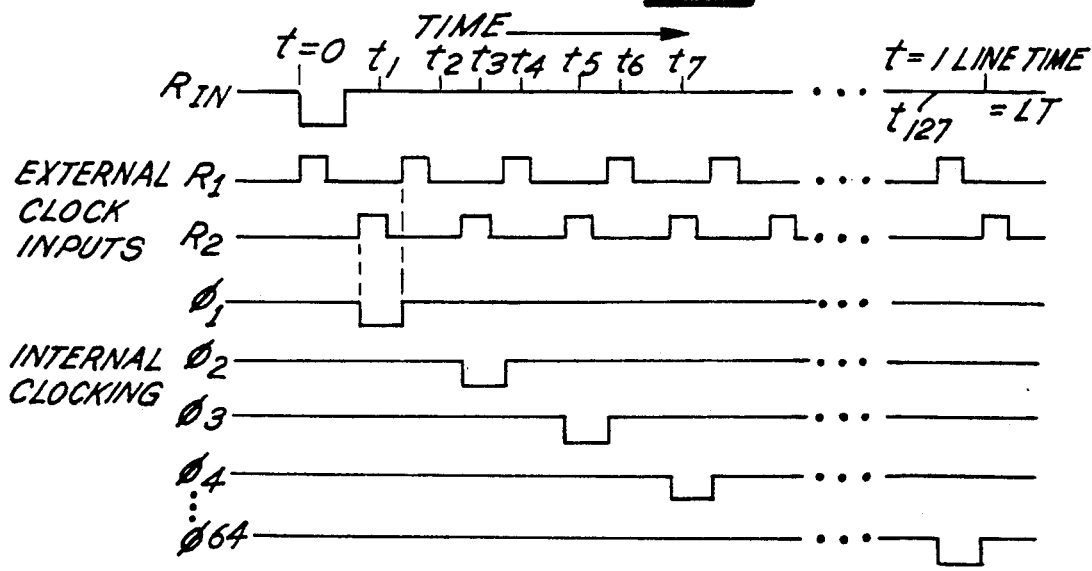
FIG. 3a is a diagram of 64 phase ripple clock timing that is known in the prior art.
Figure 3B:
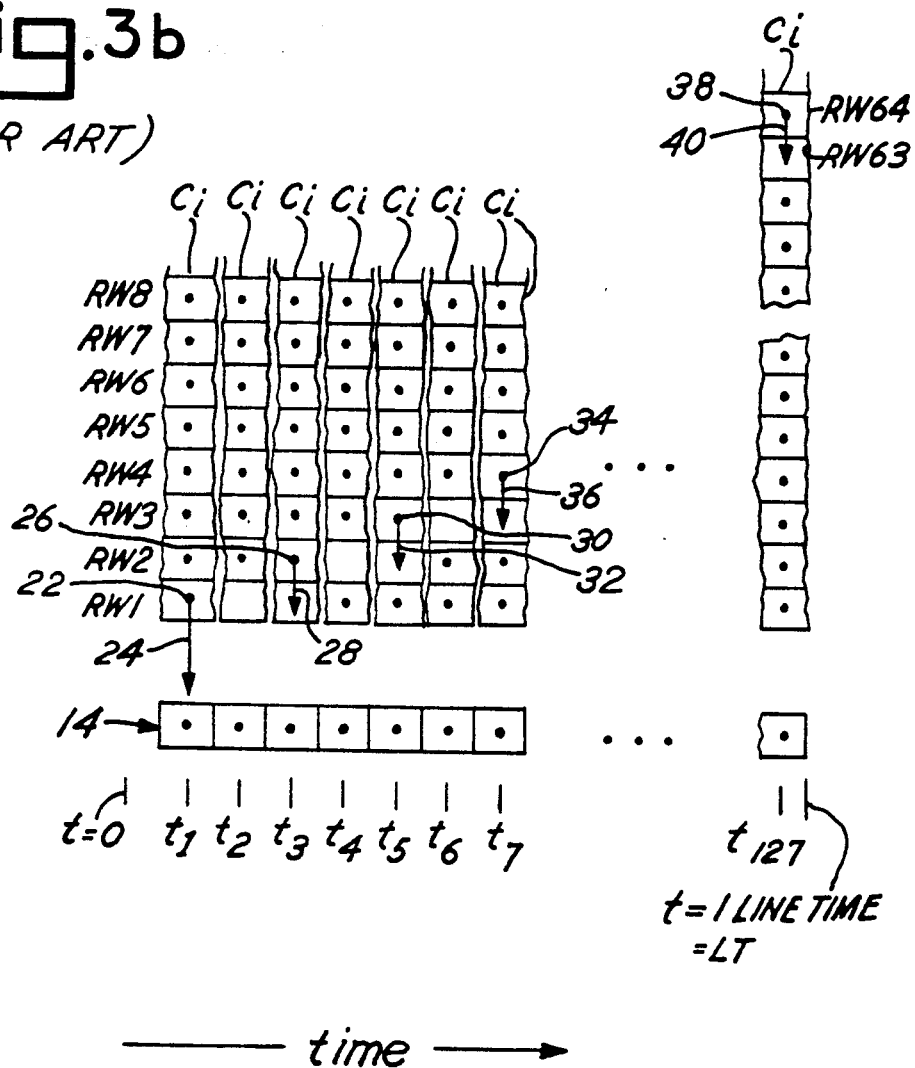

One example for a scenario in which the velocity to height ratio is doubled would be to perform the cycle of clocking shown in FIGS. 3a and 3b twice in one row readout time period, and to double the scan speed. Adjacent rows of charge can be combined and mixed in field storage region 130 (FIG. 6). The mixed charge packets can be read out at the typical line rate. In this example, the rate of charge motion is doubled, but synchronicity with the image scan line is maintained. Since two rows of charge packets are mixed, the image resolution is ½, which is a significant improvement over the resolution achieved by prior art clocking.

Figure 9A:
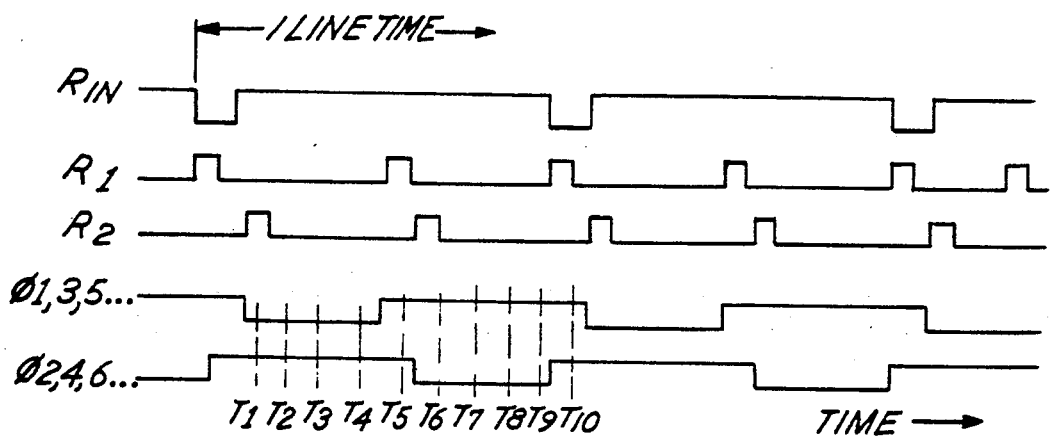
FIG. 9a is a timing diagram of clocking according to one form of the present invention where the number of cycles of clocking performed is 1 and the number of phases selected is 2.

Another way to increase resolution according to the present invention is to generate the clocking signals shown in FIG. 9a which are supplied to the first stage of shift register 122 (FIG. 5). If signals $R_1$ and $R_2$ are pulsed twice per line time ($R_{IN}$ once per line time) as shown, during a transient period of at most 32 line times, the "0" pulses are advanced through the 64 stages of shift register 122. After 32 line times, a pattern of "0's" is created in shift register 122 such that every other output stage of shift register 122 is in a "0" state simultaneously. The number of phases of clocking is selected to be 2, meaning that after the transient period of time has elapsed and the pattern of "0's" established in the entire shift register, every other row of the array is clocked at the same time. The charge packets from adjacent rows are mixed as they are transferred and the resultant charge motion is two rows per line time. The image scan speed must be doubled to optimize resolution at this doubled rate of charge motion. In operation, the transient period during which the pattern of "0's" is created in the shift register is of such a brief duration that the data read out during this time period can be simply discarded.

Figure 9B:
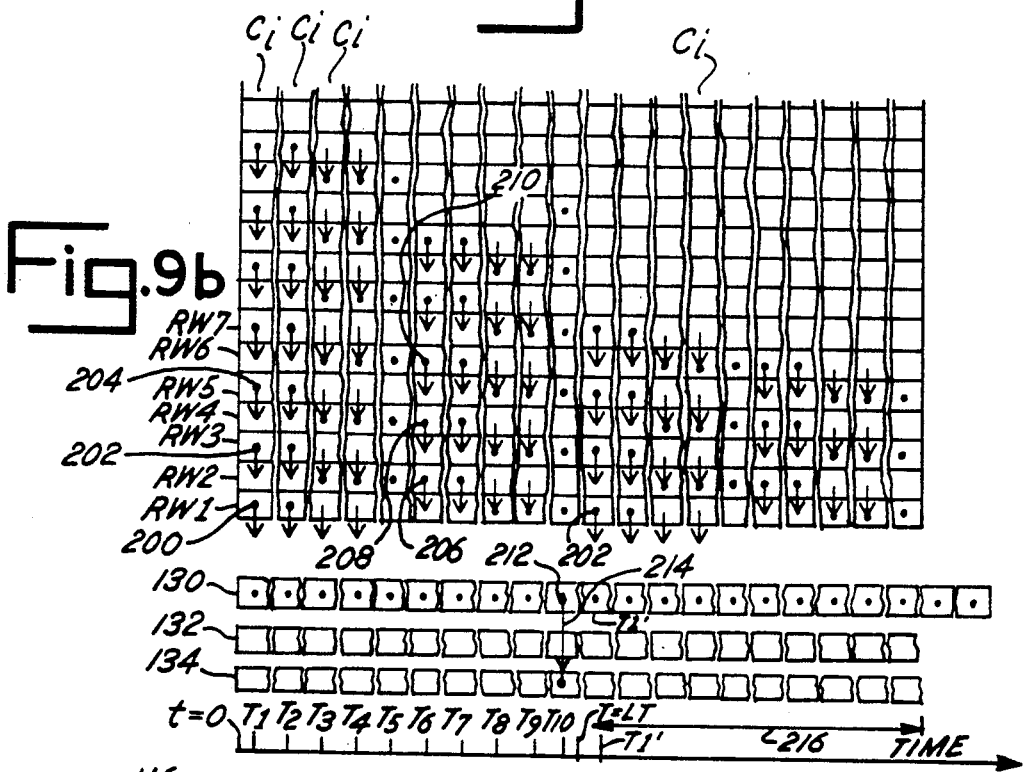

FIG. 9b shows the motion and position of charge packets in one column of array 116, arbitrarily selected to be column Ci, at various separated points in time during two successive line times (i.e., at time t=0 to time T=LT, repeated twice). The points in time $T_1$-$T_{10}$ shown in FIG. 9a are repeated in FIG. 9b to show the times when the motion of the charge packets occurs. At times $T_1$-$T_4$, while $\phi_1$, $\phi_3$, $\phi_5$, etc. are in a "0" state, charge packet 200 is shifted from row RW1 to readout device 126, charge packet 202 is shifted from row RW3 to row RW2 and mixed with the charge packet in row RW2, charge packet 204 is shifted from row RW5 to row RW4 and mixed with the charge packet in row RW4, and so on up through column Ci. At time T5, there is no charge motion in the array, and there is no appreciable charge in rows RW1, RW3, RW5, etc. At time T6-T9, while $\phi_2$, $\phi_4$, $\phi_6$, etc. are in a "0" state, charge packet 206 is shifted from row RW2 to row RW1, charge packet 208 is shifted from row RW4 to row RW3, charge packet 210 is shifted from row RW6 to row RW5, and so on. At time T10, there are no charge packets in rows RW2, RW4, RW6, etc., and charge packet 212 is shifted from the field storage gate 130 through the transfer gate 132 to the horizontal output shift register 134 as shown by an arrow 214. The identical process is repeated in the second line time 216. Note that the second line time begins with the transferring out of charge packet 202 from row RW1 to the row readout device 126 at time T1'.

When one cycle of clocking is performed in one readout time (as shown in FIGS. 9a and 9b), two rows of charge packets are mixed into one row in one line time. To optimize resolution in this case (1 cycle of 2 phase clocking per line time), the scan speed must be increased by a factor of 2. The increased scan speed may itself be dictated by higher velocity to height ratio in a non-scanning application, or may be a chosen parameter, e.g., a command from computer 108 (FIGS. 4 and 7) to scan mirror driver 110.

As noted earlier, the row readout rate of row readout device 126 defines a base row readout rate that typically is the maximum readout rate of which row readout device 126 is capable. When array 116 is scanned with radiation at a rate exceeding the base row readout rate, the clocking of the array must be altered in order to optimize resolution. It has been discovered that resolution is optimized when the radiation scan rate equals the base row readout rate multiplied by an adjustment factor defined as:

$$\frac{AB}{B-1}$$

where A is the number of cycles of clocking per line readout time (i.e., the number of rows of pixel information transferred to the row readout device 126 in one row readout time period) and B is the number of phases selected. Preferably, A is a positive integer greater than 0 and B is a positive integer greater than 1. In order to select the number of phases, at least some of the rows are divided into a plurality of groups of B rows, one of the rows in each group being selected for simultaneous transfer of pixel information to an adjacent row. For an increased scan rate due to a high velocity to height ratio, the relationship between the number of cycles of clocking and the phases can be adjusted to achieve optimal image resolution. The reciprocal, $$\frac{B-1}{AB}$$

gives the resolution where a resolution of 1 equals full resolution. In the example shown in FIGS. 9a and 9b, A=1 and B=2, as 1 cycle of clocking is performed in one row readout time, and the array is divided into a plurality of groups of 2 rows.

Figure 10A:
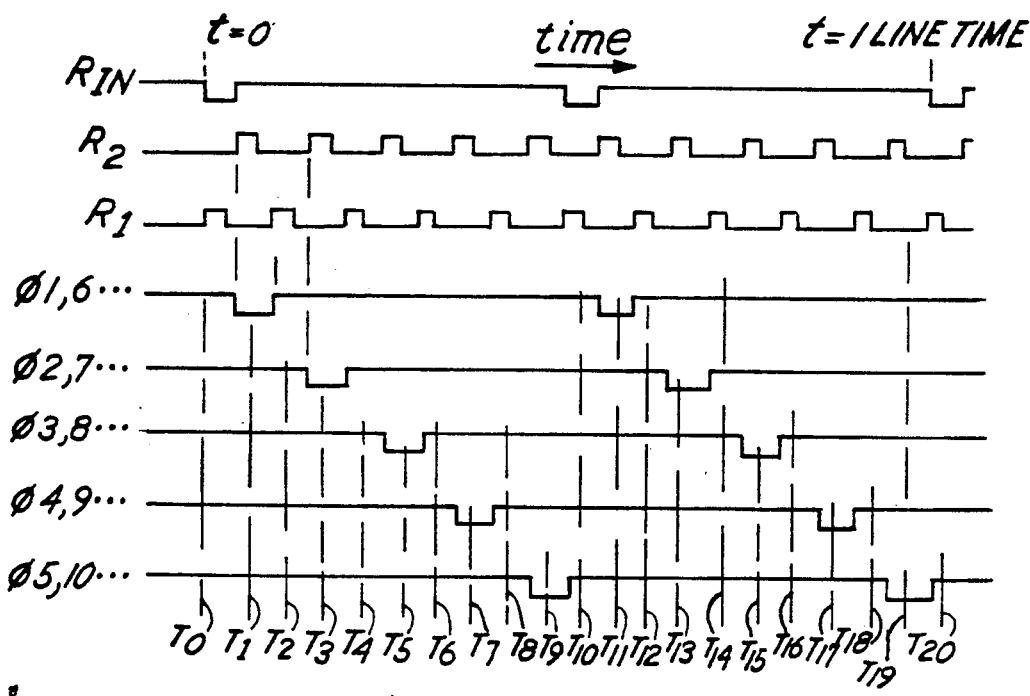
FIG. 10a is a timing diagram of clocking according to another form of the present invention where the number of cycles of clocking performed is 2 and the number of phases selected is 5.

Another example of clocking according to the present invention is shown in FIG. 10a in which the number of cycles of clocking performed is 2 and the number of phases selected is 5. Such parameters may be needed when the velocity/height ratio dictates that the radiation scan rate exceeds the base row readout rate by a factor of 2.5. In this example, A=2, B=5, so a base row readout rate increase factor of $$\frac{AB}{B-1} = 2.5$$

will optimize resolution at 2/5 of full resolution. To generate the clocking shown in FIG. 10a, the $R_{in}$ signal (FIG. 8) is injected into the first stage of shift register 122' and 5 cycles of the $R_1$ and $R_2$ signals are clocked, shifting the "0" pulse up the shift register 5 stages. After the 5 cycles of R1 and R2 are clocked, and in the second half of the row readout time period, the $R_{in}$ signal is injected again into the first stage of shift register 122', and the $R_1$ and $R_2$ signals are clocked another 5 cycles, advancing the "0" pulses from stage 1 to stage 6 and from stage 6 to stage 11. With this clocking, it takes a transient period of seven line times to build up the desired pattern of "0's" in the 64 stage shift register 122 (FIG. 7). After the 7 line times have elapsed, the desired pattern of "0"s is created in the shift register (FIG. 7)

and the desired pattern of charge motion (shown in FIG. 10b) is created in the entire array.

Figure 10B:
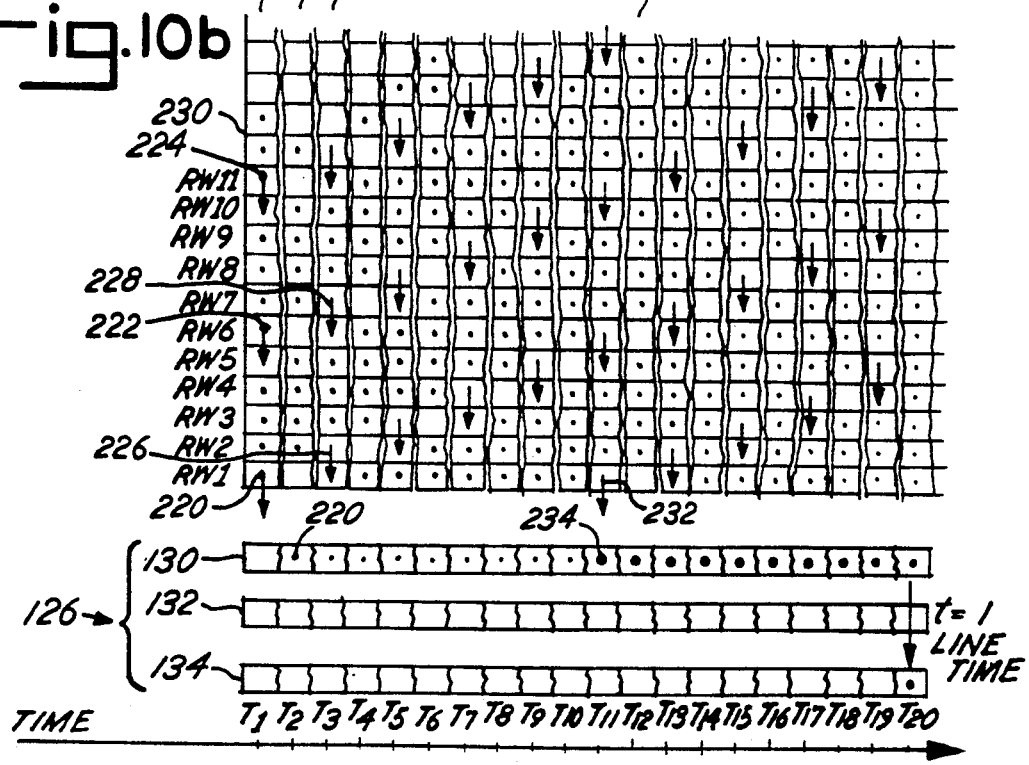

FIG. 10b shows the motion and position of charge packets in one column of array 116, arbitrarily selected to be column Ci, at various separated points during one line time, i.e., at times T1-T20. The points in time T1-T20 shown in FIG. 10a are repeated in FIG. 10b to show the times when the motion of the charge packet occur. At time T1, when clocks $\phi_1$, $\phi_6$, $\phi_{11}$, etc. are clocked low (FIG. 10a), charge packet 220 is shifted from row RW1 to field storage region 130, charge packet 222 is shifted from row RW6 to row RW5, charge packet 224 is shifted from row RW11 to row RW10, etc. At time T2, no charge motion occurs and rows RW1, RW6 and RW11, etc. have no appreciable charge in them. At time T3, when clock $\phi_2$, $\phi_7$, $\phi_{12}$, etc. are clocked low, charge packet 226 is shifted from row RW2 to row RW1, charge packet 228 is shifted from row RW7 to row RW6, charge packet 230 is shifted from row RW12 to row RW11, etc.

As shown in FIG. 10b, at time T5, charge is shifted in rows RW3, RW8, RW13 etc. to the adjacent row. At time T7, charge is shifted in rows RW4, RW9, etc. and at time T9, charge is shifted in rows RW5, RW10, etc. to the adjacent row. At time T11, which is in the second half of the line time, a second cycle of clocking is initiated and the charge motion that occurs at times T11-T20 is identical to the charge motion that occurs at times T1-T10. At time T11, charge packet 232 is shifted to field storage gate 130, where the charge is mixed with the charge packet 220 transferred out at time T1 to form charge packet 234. At time T20, charge packet 234 is shifted through the transfer gate 132 to horizontal output shift register 134. Again, in FIG. 10b, the number of cycles of clocking is 2, so A=2. Since the array is divided up into groups of 5 rows per group, the number of phases selected is 5, so B=5.

Other modes of clocking can be used so that the transition from a radiation scan rate at the maximum row readout rate to scan rates 7 or more times faster than the maximum row readout rate is smooth. While not the only possibilities, the modes of clocking listed in the following table are preferred. In Table 1, "×(times) faster" means the number of times faster than the maximum row readout rate and "resolution" is the resolution of the defined mode compared to the full resolution.

TABLE 1

Mode 1.5 (scan rate=1.5×faster, resolution=$\frac{2}{3}$)
   cycles of clocking performed=1=A
   number of phases selected=3=B
Mode 2 (scan rate=2×faster, resolution=$\frac{1}{2}$)
   cycles of clocking performed=1=A
   number of phases selected=2=B
Mode 2.5 (scan rate=2.5×faster, resolution=2/5)
   cycles of clocking performed=2=A
   number of phases selected=5=B
Mode 3 (scan rate=3×faster, resolution=$\frac{1}{3}$)
   cycles of clocking performed=2=A
   number of phases selected=3=B
Mode 4 (scan rate=4×faster, resolution=$\frac{1}{4}$)
   cycles of clocking performed=2=A
   number of phases selected=2=B
Mode 5 (scan rate=5×faster, resolution=1/5)
   cycles of clocking performed=4=A
   number of phases selected=5=B
Mode 6 (scan rate=6×faster, resolution=1/6)
   cycles of clocking performed=3=A
   number of phases selected=2=B
Mode 7 (scan rate=7×faster, resolution=1/7)
   cycles of clocking performed=6=A
   number of phases selected=7=B
Mode 8 (scan rate=8×faster, resolution=$\frac{1}{8}$)
   cycles of clocking performed=4=A
   number of phases selected=2=B Other modes of course are possible. Since the choices for A and B for any given mode may be different, the present invention is intended to include other choices.

Ideally, in a case such as Mode 2.5 (2 cycles of 5 phase clocking, see FIGS. 10a and 10b) the line time is broken up into 10 equal parts and the $R_1$ and $R_2$ clocks are equally spaced apart in the time dimension so that the clock "rippling" is even and all rows have the same time period of charge integration. However, some charge-coupled devices have been designed so that all the field storage gates 130 (FIG. 6) are not empty until after the second of two field storage gate pulses, so one cannot transfer out row 1 until the second pulse. In this design, odd pixels are shifted out of the field storage gate with the first pulse and the even pixels are shifted later with the second pulse. The vertical time delay and integrate clocking must be put on hold until the storage gates are empty, and this does not occur until after the second pulse transfers out the even pixels. All charge motion thus occurs during the second half of the line time. One could simultaneously pulse the even and odd pixels, where they mix in the readout register, giving $\frac{1}{2}$ horizontal resolution. Now, the storage gates are emptied immediately and the full line time is available for vertical clocking. For charge-coupled devices that have two readout registers, one for even pixels and one for odd pixels, the field storage gates can be emptied immediately and the entire row readout time can be used for vertical clocking, and full horizontal resolution is maintained.

While I have disclosed the apparatus and method of the present invention applied in an exemplary charge-coupled device, it will be understood that the implementation of the teachings of the present invention may vary depending on the particular design of the image information processing system. For example, in an 8-phase design of a charge-coupled device, where the time delay and integrated rows are arranged in blocks of 8 rows, the teachings of the present invention can be used with exactly the same results using the adjustment factor $$\frac{AB}{B-1}$$

but there is one additional restriction: 8 must be evenly divisible by B, or in other words, the number of phases clocked can be either 2, 4, or 8. The scope of the appended claims are not intended to be limited to any particular construction of a time delay and integrate charge-coupled device.

Those skilled in the art will further recognize that the preferred embodiments may be altered or modified without departing from the true spirit and scope of the invention as defined in the accompanying claims.

What is claimed is:

1. In a system for processing image information comprising an array of cells capable of representing pixel information arranged in rows and columns, and further comprising row read out means for transferring pixel information represented by a row of the cells to a utilization device at a predetermined row read out rate corresponding to a predetermined row read out time period, improved apparatus for optimizing resolution of the system comprising in combination:

means for scanning said rows with radiation at a variable row scan rate;

row transfer means for simultaneously transferring pixel information located in a plurality of the rows having a predetermined row relationship to adjacent rows and for transferring pixel information located in a predetermined number of the rows to the read out means during the row read out time period; and adjusting means for adjusting the relationship between the variable row scan rate, predetermined row relationship and predetermined number of rows to improve the resolution of an image generated by said system during time periods in which the row scan rate exceeds the row read out rate of the row read out means.

2. Apparatus, as claimed in claim 1, wherein the predetermined row relationship is defined by dividing at least some of the rows into a plurality of groups of B rows, one of the rows in each said group being selected for simultaneous transfer of pixel information by the row transfer means, where B is a positive integer greater than 1.

3. Apparatus, as claimed in claim 2, wherein the adjusting means operates so that the row scan rate is inversely proportional to B−1.

4. Apparatus, as claimed in claim 2, wherein said predetermined number of rows equals A, where A is a positive integer greater than 0.

5. Apparatus, as claimed in claim 4, wherein the adjusting means operates so that the row scan rate is directly proportional to A times B.

6. Apparatus, as claimed in claim 4, wherein the row read out rate defines a base row scan rate and wherein the adjusting means operates so that the row scan rate substantially equals the base row scan rate times (AB)/(B−1).

7. Apparatus, as claimed in claim 1 and further comprising means for scanning each row of the array with radiation at the variable row scan rate.

8. Apparatus, as claimed in claim 7, wherein the means for scanning comprises a moving vehicle carrying the row transfer means and adjusting means.

9. Apparatus, as claimed in claim 8, and further comprising means for measuring the row scan rate and wherein the adjusting means comprises means for adjusting at least one of the predetermined row relationship and the predetermined number of rows in response to changes in the row scan rate.

10. Apparatus, as claimed in claim 1, wherein the row transfer means comprises:

phase means for simultaneously transferring pixel information located in a plurality of rows having a predetermined row relationship; and cycle means for transferring pixel information from a predetermined number of rows to the read out means during the row read out time.

11. Apparatus, as claimed in claim 1, wherein the row read out means comprises a shift register.

12. Apparatus, as claimed in claim 1, wherein the row transfer means comprises a shift register and a clock driver driven by said shift register.

13. Apparatus, as claimed in claim 1, wherein the radiation is light.

14. Apparatus, as claimed in claim 1, wherein the array of cells comprises a charge-coupled device.

15. In a system for processing image information comprising an array of cells capable of representing pixel information arranged in rows and columns, and further comprising row read out means for transferring pixel information represented by a row of the cells to a utilization device at a predetermined row read out rate corresponding to a predetermined row read out time period, a method for optimizing resolution of the system comprising the steps of:

scanning said rows with radiation at a variable row scan rate;

simultaneously transferring pixel information located in a plurality of the rows having a predetermined row relationship to adjacent rows and transferring pixel information located in a predetermined number of the rows to the read out means during the row read out time period; and adjusting the relationship between the variable row scan rate, predetermined row relationship and predetermined number of rows to improve the resolution of an image generated by said system during time periods in which the row scan rate exceeds the row read out rate of the row read out means.

16. The method, as claimed in claim 15, wherein the predetermined row relationship is defined by dividing at least some of the rows into a plurality of groups of B rows, one of the rows in each said group being selected for simultaneous transfer of pixel information, where B is a positive integer greater than 1.

17. The method, as claimed in claim 16, wherein the row scan rate is adjusted to be inversely proportional to B−1.

18. The method, as claimed in claim 16, wherein said predetermined number of rows equals A, where A is a positive integer greater than 0.

19. The method, as claimed in claim 18, wherein the row scan rate is adjusted to be directly proportional to A times B.

20. The method, as claimed in claim 18, wherein the row read out rate defines a base row scan rate and wherein the row scan rate is adjusted to be substantially equal to the base row scan rate times (AB)/(B−1).

21. The method, as claimed in claim 15, and further comprising the step of scanning each row of the array with radiation at the variable row scan rate.

22. The method, as claimed in claim 21, wherein the step of scanning comprises the step of carrying the image processing system in a vehicle and exposing said array to radiation as the vehicle moves.

23. The method, as claimed in claim 22, and further comprising the step of measuring the row scan rate and wherein the step of adjusting further comprises the step of adjusting at least one of the predetermined row relationship and the predetermined number of rows in response to changes in the row scan rate.

24. The method, as claimed in claim 15, wherein the radiation is light.

25. The method, as claimed in claim 15, wherein the array of cells comprises a charge-coupled device.

* * * * *